Figure 1:
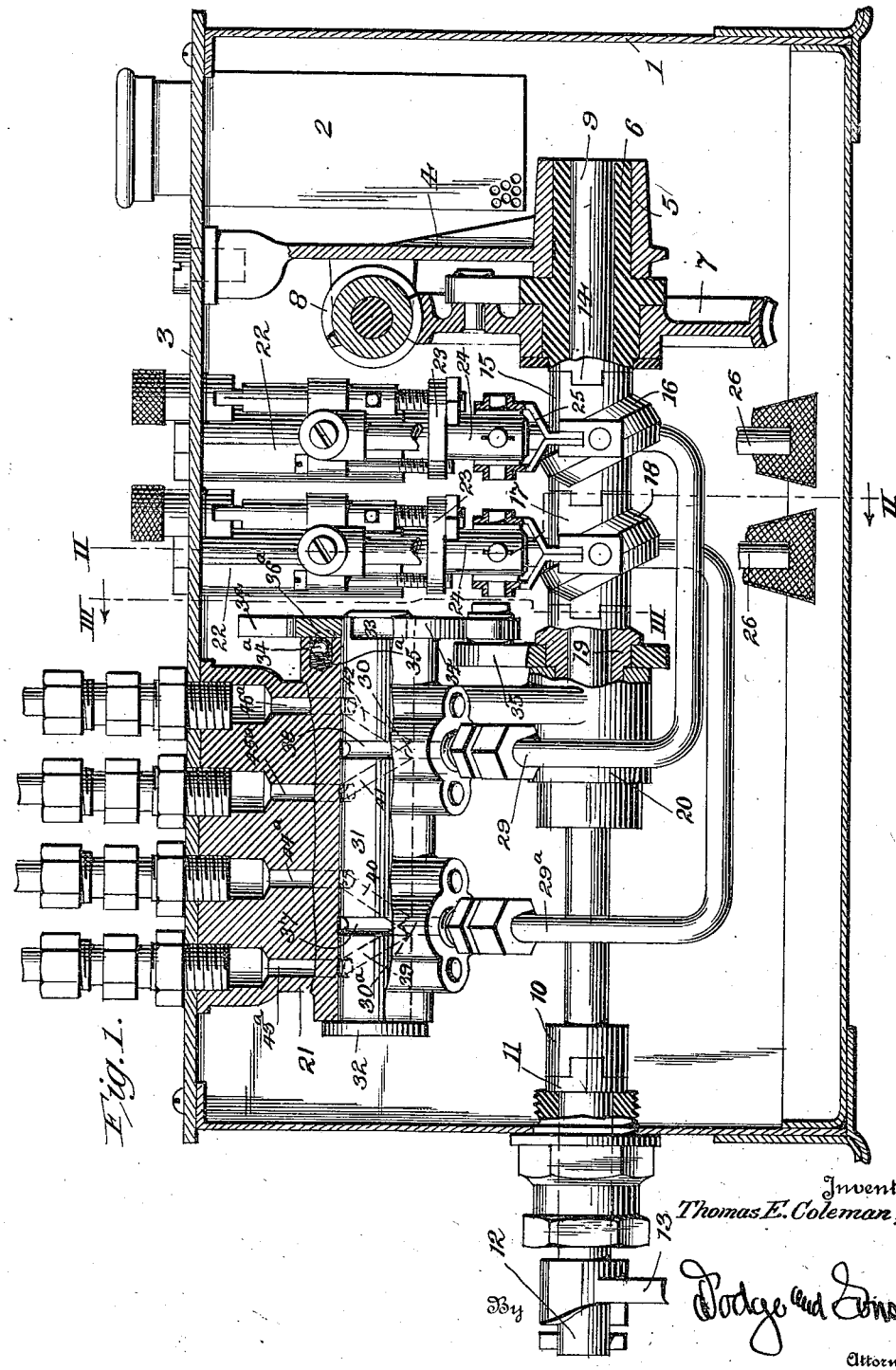

April 7, 1925.

T. E. COLEMAN

LUBRICATOR

Filed July 21, 1922  3 Sheets-Sheet 1

1,532,620

Inventor.
Thomas E. Coleman,
By Dodge and Sons
Attorneys.

April 7, 1925. 1,532,620
T. E. COLEMAN
LUBRICATOR
Filed July 21, 1922 3 Sheets-Sheet 2
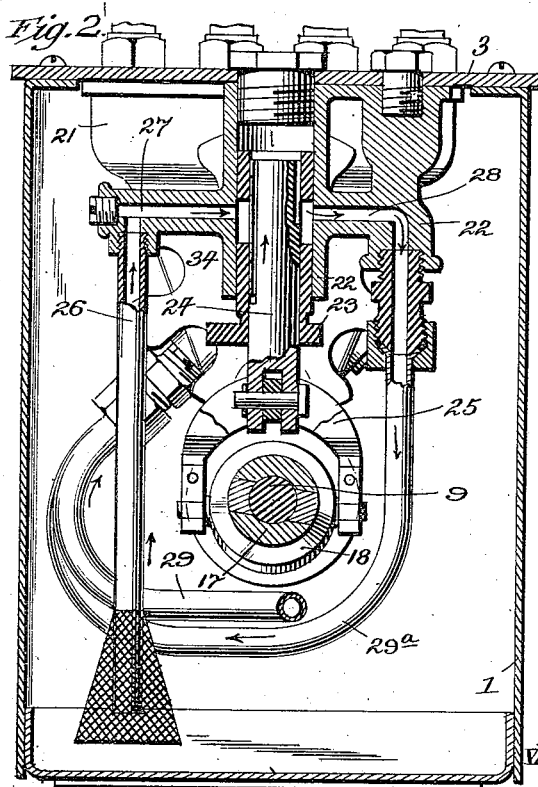

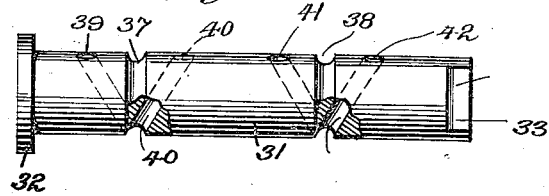
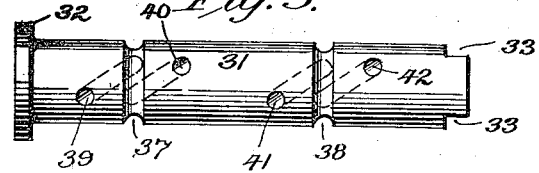
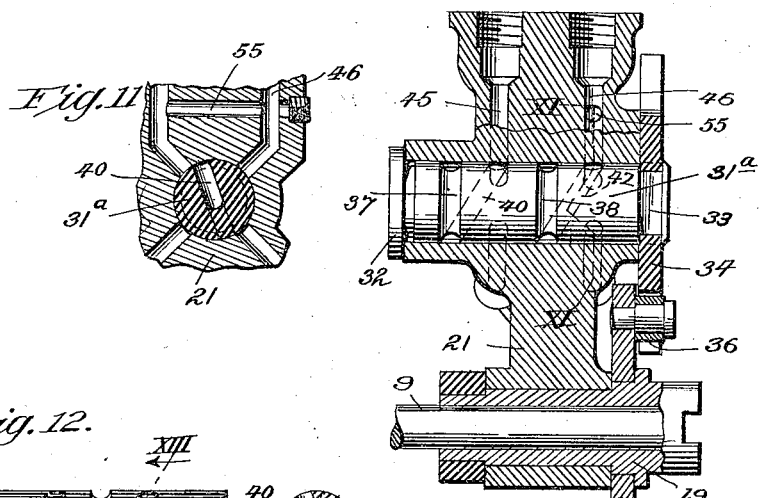
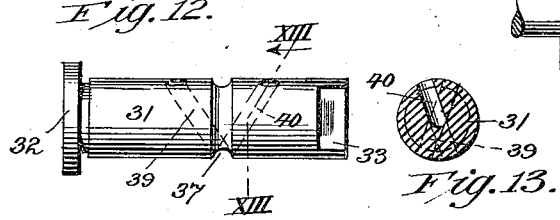

Patented Apr. 7, 1925.

1,532,620

UNITED STATES PATENT OFFICE.

THOMAS EMMET COLEMAN, OF MADISON, WISCONSIN, ASSIGNOR TO MADISON-KIPP CORPORATION, OF MADISON, WISCONSIN, A CORPORATION OF WISCONSIN.

LUBRICATOR.

Application filed July 21, 1922. Serial No. 576,600.

*To all whom it may concern:*

Be it known that I, THOMAS E. COLEMAN, a citizen of the United States, residing at Madison, in the county of Dane and State of Wisconsin, have invented certain new and useful Improvements in Lubricators, of which the following is a specification.

This invention pertains to lubricators and more particularly to that type wherein a regulated quantity of oil is periodically forced to a plurality of points to be lubricated.

Automobiles in particular, as is well known, require adequate but regulated lubrication, and it is essential that each bearing or part to be lubricated shall receive its proper quantity of oil.

The present invention has for its main object the provision of a simple structure whereby such lubrication may be positively effected.

In the drawings,—

Fig. 1 is a vertical longitudinal sectional elevation of a lubricator embodying my invention;

Fig. 2 a transverse vertical sectional view on the line II—II of Fig. 1;

Fig. 3 a similar view on the line III—III of Fig. 1;

Fig. 4 a transverse vertical section of the distributor head or casting showing four of the sixteen discharge ports or conduits, the rotatable valve or distributor element being so positioned that all of such conduits are closed off;

Fig. 5 a horizontal sectional view on the line V—V of Fig. 4;

Fig. 6 a detail sectional view showing the rotary distributor approaching its closed position with reference to one of the feed conduits;

Fig. 7 a transverse section on the line VII—VII of Fig. 5 illustrating one of the annular grooves or feed channels which encircle the distributor;

Fig. 8 a side elevation, partly broken away, of a rotatable distributor element;

Fig. 9 a similar view, the element having been rotated axially through 90°;

Fig. 10 a vertical sectional view showing a structure designed to control eight conduits, and the distributor being of a slightly modified form;

Fig. 11 a transverse sectional view on the line XI—XI of Fig. 10;

Fig. 12 a side elevation of a distributor element of the form first illustrated and adapted to an eight conduit feed; and Fig. 13 a cross section on the line XIII—XIII of Fig. 12.

Referring first to the construction illustrated in Figs. 1 to 9 inclusive, 1 denotes a suitable oil reservoir, provided with a filler strainer 2 extending downwardly from a removable cover 3. Secured to the under face of the cover and extending downwardly into the reservoir is a bracket 4 at the lower end of which there is formed a bearing 5 for a hub or sleeve 6, upon which is mounted and secured a worm gear 7 designed to be driven by a worm 8 which in turn is actuated from a moving part of the structure to be lubricated. A shaft 9 is supported at one end in the sleeve 6, the shaft at its opposite end carrying one member 10 of a slidable coupling, the other member 11 being secured to a stub shaft 12 mounted in the adjacent end wall of the reservoir 1 and adapted to be actuated by hand through the medium of a crank or lever 13.

The inner end of sleeve 6 is provided with a projection 14 adapted to enter a slot formed in a hub 15 which is part of a wobbling eccentric 16 of one of the pump units hereafter described. Said hub 15 is likewise engaged with a second hub 17 upon which is mounted a wobbling eccentric 18 of a second pump unit later to be described. The hub 17 in turn is interconnected with a sleeve 19 which finds its bearing in a box 20 formed in a downward extension of the distributor casting denoted generally by 21.

The pumps heretofore referred to are alike in form and operation and a description of one will therefore suffice for both, and similar parts will be similarly lettered. The pump casting is denoted by 22 and the cylinder thereof is preferably controlled by an adjustable sleeve 23 in the manner set forth and claimed in Letters Patent 1,262,979, dated April 16, 1918. The piston 24 is connected by a yoke 25 which functions with the wobbling eccentric 16 (or 18). The pump may be of any approved type, that shown being so constructed that the piston is oscillated so as to bring spill ports into registry when the piston has caused the discharge of a fixed or regulated quantity of oil. The intake of the pump is shown as a pipe 26 that extends down to the lower portion of the reservoir, as best indicated in Fig. 2. Said pipe 26 is in communication with an intake port 27 and an exhaust port 28 is located upon the opposite side of the housing 22, a pipe 29 being connected with the outlet of said discharge conduit or port 28, extending downwardly and laterally therefrom and being connected to a port or opening 30 (see Fig. 7) formed in the lower portion of the distributor casting. A similar pipe, denoted by 29ª leads from the second pump and is connected to a second opening 30ª formed in the lower portion of the casting. A bore or opening is formed in the lower portion of the distributor casting 21, said bore extending horizontally therethrough and forming a seat for a rotating distributor element 31, shown in detail in Figs. 8 and 9. One end of said element is provided with a head 32 which makes a close fit against the end of the distributor casting while the opposite end of said distributor element 31 is flattened, as at 33, and attached thereto is a star or pocketed wheel 34. A crank 35 carrying a roller or bowl 36 is attached to the sleeve 19 (Fig. 1) and as the actuating shaft is rotated the arm 35 is moved in the direction of the arrow (Fig. 3) and the actuator or star wheel 34 is advanced step-by-step so as to bring one or another of the ports or passages in the rotary distributing element 31 into line with the distributor conduits or passages formed in the casting 21 and the ports or openings 30, 30ª with which the pumps are connected, as above described. The distributor element 31, in the form where two pumps are employed, is provided with two circumferential grooves or channels 37 and 38, which, when the parts are positioned, are at all times in communication with the ports 30, 30ª. A pair of inclined ports or passages communicate with each of the circumferential grooves or channels 37 and 38, those communicating with the channel 37 being designated by 39 and 40, while those communicating with the feed channel 38 being designated by 41 and 42. As will be best seen upon reference to Figs. 8 and 9, each pair of inclined channels are similarly arranged and pass diametrically through the rotatable distributor element 31, said channels inclining respectively to each side of the feed groove 37 or 38 so that the discharge ends thereof are spaced apart both longitudinally and circumferentially of the rotatable element 31.

The casting 21 is provided with sixteen openings in its upper face into which are threaded pipes that extend to the points to be lubricated. The openings communicate at their lower ends with conduits arranged in banks of four across the casting (see Fig. 5), and are designated, respectively, by 43, 43ª, 43ᵇ, 43ᶜ; 44, 44ª, 44ᵇ, 44ᶜ; 45, 45ª, 45ᵇ, 45ᶜ; 46, 46ª, 46ᵇ, 46ᶜ. In fact the openings and conduits may be treated as conduits having enlarged upper threaded ends. In order to facilitate the formation of the innermost pair of conduits 45ª and 45ᵇ, and the similar ones, the casting is bored partially through from below and plugs, as 47, are secured in the lower end of such opening.

As will be seen upon reference to Fig. 5 the discharge end of the port or passage 39 stands in line with the various ports 43 to 43ᶜ inclusive. The discharge opening of the port or passage 40 stands in line with the conduits 44 to 44ᶜ inclusive. The discharge end of the port 41 stands in alinement with the conduits 45 to 45ᶜ inclusive, while the discharge of the channel 42 stands in alinement with the mouths of the conduits 46 to 46ᶜ inclusive. The discharge mouth of each channel is brought successively into alinement with the intake mouth of each conduit of the series which said channel serves, and this is effected through the step-by-step rotation of the member 31 through the operation of the crank 35 and its roller 36 upon the star wheel 34. As will be seen upon reference to Fig. 3, there are eight pockets in this wheel so that the distributor 31 is rotated through an angle of 45° and then comes to rest. The parts are so timed that the pump begins its forcing stroke, forcing the oil through the outlet 28 and the pipe 29 or 29ª, as the case may be, to the opening 30 or 30ª and to the groove 37 or 38 just before the mouth of the channel 39 or 40 (or 41 or 42) comes into alinement with one or another of the conduits 43 et seq.

In Fig. 3 the actuator 35 is about to complete one step in the movement of the star wheel 34, and the passage, (shown in dotted lines in Fig. 6) is about to pass out of registry with the adjacent conduit with which it had been in registry, and the other passage (shown in full lines) is about to come into registry with one or the other conduit.

In order to prevent any possible overthrow of the distributor 31 and thus carry the ports out of registry I provide an impositive stop consisting of a ball (see Fig. 1) 34ª, urged outwardly by a spring 35ª seated in rear of the ball and in a pocket formed in the casting 21, the ball functioning with depressions 36ª provided in the adjacent face of the wheel 34.

In Figs. 10 and 11 a slight modification of the structure is shown. In this instance the distributor is denoted by 31ª and is provided with but a single passage leading from each of the circumferential grooves with which the pumps connect. With such an arrangement each pump supplies four conduits. It is conceivable that the eight conduits may be supplied from a single pump, in which instance the distributor would take the form shown in Fig. 12, wherein there is but a single circumferential groove with two channels opening thereinto and having their discharge mouths spaced apart in the same manner as specified in connection with Figs. 8 and 9. It is manifest, of course, that by employing a greater or less number of pockets or openings in the periphery of the star wheel 34, and correspondingly forming a greater or less number of channels in the distributor element and the requisite number of conduits leading therefrom, that a greater or less number of parts may be lubricated. It is also manifest that the conduits in the distributor casting can be interconnected by cross drillings thereby permitting a double or multiple discharge through any one of the conduits, in which case the other opening leading from the casting would be plugged or closed. Thus, in Figs. 10 and 11, a cross channel 55 is shown, connecting the adjacent conduits, and the oil passing from the opening 40 would be forced through each of said adjacent conduits as it comes into registry with the mouth thereof. If the outlet for one of the conduits was not closed only a portion of oil would pass through each conduit, whereas if the mouth of one of them was closed the entire charge would pass through the unclosed mouth each time the channel in the rotary distributor came into register with each of the conduit mouths.

What is claimed is,—

1. In a force feed lubricator, the combination of an actuating shaft; a pump operated thereby; a distributor casting provided with a plurality of conduits extending to the points to be lubricated; a distributor element mounted in said casting, said distributor element having a circumferential groove formed therein and a plurality of channels extending therethrough, said channels communicating at one end with said circumferential groove and at their opposite ends standing in alinement with the conduits through which the oil is to be forced; and means operable in timed relation with the pump for moving said distributor element step-by-step to cause the channels to register successively with the respective conduits.

2. In a force feed lubrication, the combination with a reservoir; a casting located within the same provided with a plurality of spaced conduits communicating with an opening formed in said casting; a rotatable member seated within said opening and normally closing the same, said member being provided with an annular groove and a passage extending through said member in an inclined direction and communicating at one end with said annular groove, the opposite end standing in alinement with the mouths of the conduits formed in the casting; a pump, the discharge opening whereof is in communication with the groove in the rotatable member; and means for operating said pump and rotating said rotatable member in timed relation.

3. In a force feed lubricator, the combination of a casting having a plurality of series of ports formed therein, the ports of each series standing in alinement transversely of the axis of said casting and opening into a bore formed in said casting; a rotatable member fitting within the bore, said member having an annular groove formed therein; a pair of passages extending through the rotatable member and inclining in opposite directions away from the groove, the opposite ends of the passages communicating with said groove; a pump, the discharge port of which is in communication with the groove; and means for operating the pump and imparting a step-by-step movement to said rotatable member, the parts being so proportioned and arranged that one or another of the passages extending through the rotatable member is brought into alinement with one or another of the conduits formed in the casting when the pump is making its impelling stroke.

4. The combination with a casting having a plurality of series of discharge conduits arranged therein and opening into a longitudinal bore formed in the casting, the mouths of the conduits being in spaced relation in each series; a rotatable member fitting within the bore and normally closing the same, said rotatable member being provided with an external groove located between the mouths of the series of conduits, said member being likewise provided with two inclined passages which open at one end into the groove and diverge therefrom so that the opposite ends of said passages stand in alinement with the respective series of mouths of the conduits which open into the bore; a pump, the discharge port whereof is in communication with the groove in the rotatable member; a shaft for operating the pump; and means likewise operated by the shaft for imparting a step-by-step movement to the rotatable member.

5. In a force feed lubricator, the combination of a casting having a plurality of series of spaced conduits opening into a bore formed in said casting, the mouths of the conduits of each series standing in spaced relation; a rotatable member mounted within said bore, said member being provided with a circumferential groove located between the mouths of the conduits which open into the bore, and likewise provided with two diverging passages extending therethrough, the adjacent ends of the passages opening into the groove and the opposite ends standing in alinement, respectively, with the mouths of the conduits; a pump, the discharge port whereof is in communication with the groove formed in the rotatable member; a star wheel secured to the rotatable member; a crank; a roller carried thereby and cooperating with the star wheel to advance the same step-by-step; and means for operating the pump and crank in consonance.

6. In a force feed lubricator, the combination of an actuating shaft; a pump operated thereby; a distributor casting having at least one conduit extending to the point to be lubricated; a cylindrical distrbuting member mounted for rotation in the casting and having at least one outwardly opening inclined channel formed therein, one end whereof is adapted to be brought into register with the oil conduit; and means for imparting rotatable movement to said distributing member in timed relation to the pump, said pump discharging into an annular groove which registers with the opposite end of the inclined channel.

In testimony whereof I have signed my name to this specification.

THOMAS EMMET COLEMAN.